Patented Oct. 13, 1953

2,655,518

UNITED STATES PATENT OFFICE 2,655,518

ESTRADIENES

Frank B. Colton, Chicago, Ill., assignor to G. D. Searle & Co., Chicago, Ill., a corporation of Illinois No Drawing. Application May 7, 1952,
Serial No. 286,611

4 Claims. (Cl. 260—397.4)

The present invention relates to a new group of organic polycyclic compounds and, more particularly, to the ethers of 3-hydroxy-13-methyl-1,4,6,7,8,9,11,12,13,14,16,17 - dodecahydro - 15H-cyclopenta[a]phenanthren-17-one of the structural formula

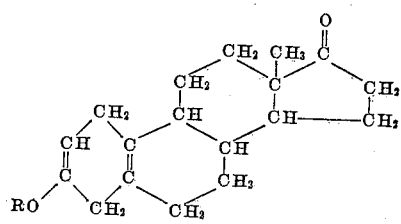

wherein R is a lower alkyl or lower phenylalkyl radical. Among the radicals which R can represent are methyl, ethyl, benzyl, straight and branch chained propyl, butyl, amyl, hexyl, phenethyl and phenylpropyl.

The compounds which constitute this invention are conveniently prepared by Oppenauer oxidation of the corresponding ether of 13-methyl-1,4,6,7,8,9,11,12,13,14,16,17 - dodecahydro - 15H-cyclopenta[a]phenanthrene - 3,17 - diol. In this oxidation common Oppenauer reagents can be used for catalysts. Lower aluminum alcoholates such as aluminum isopropoxide, butoxide and pentoxide and aluminum phenoxide are preferable to such catalysts as magnesium alkoxides, halomagnesium alkoxides, sodium alkoxides, potassium alkoxides, stannic alkoxides, and zirconium alkoxides. As hydrogen acceptors, such lower alkanones and alkanals as acetone, butanone and acetaldehyde may be employed but it is preferable to use carbonylic compounds of a higher oxidation potential and boiling point such as cyclohexanone, benzoquinone, chloranil and anisaldehyde. For solvents, such lower aromatic hydrocarbons as benzene, toluene and xylene are preferred since the reaction proceeds smoothly at their refluxing range.

The claimed compositions are valuable in providing medicinal agents which are active as estrogens, as antagonists against adrenal hyperactivity and as anabolic agents in improving nitrogen retention. A special field of utility for these ethers has been found as starting materials in a series of syntheses yielding 1,2,3,6,7,8,9,10,11,12,13,14,16,17 - tetradecahydro - 13 - methyl-17α - hydroxy - 17 - (β-hydroxyacetyl) - 15H-cyclopenta[a]phenanthren-3-one and its 11-hydroxy and 11-oxo derivatives.

The examples below illustrate in detail the procedure used in the practice of this invention. However, the invention is not to be construed as limited thereby in spirit or in scope. It will be apparent to those skilled in the art that many modifications in materials and methods may be practiced without departing from the invention. In each of these examples temperatures are given in degrees centigrade (°C.) and relative amounts of materials in parts by weight.

Example 1

To a solution of 51 parts of 17β-estradiol 3-methyl ether in 1800 parts of diethyl ether, there are added with stirring 1900 parts of liquid ammonia and then 50 parts of lithium wire in small pieces. Stirring is continued for an additional 15 minutes, after which 200 parts of absolute ethanol are added dropwise over a 20 minute interval. Upon disappearance of the blue color of the reaction mixture most of the ammonia is carefully removed on the steam bath after which water is added to decompose the reaction mixture. The aqueous layer is extracted with three 1400-part portions of ether and the combined ether layers are washed with water and dried over anhydrous sodium sulfate. The ether is removed in vacuo and the residue is crystallized from a mixture of ether and petroleum ether. Additional yield is obtained by concentration of the mother liquor and similar workup. The 3-methoxy - 13 - methyl - 1,4,6,7,8,9,11,12,13,14,16,17-dodecahydro - 15H - cyclopenta[a]phenanthren-17β-ol thus obtained melts at about 111–114° C.

A solution of 10 parts of this ether, 5 parts of aluminum isopropylate, and 83 parts of anhydrous cyclohexanone in 450 parts of toluene is heated at reflux temperature for 2.5 hours and then treated with water and 90 parts of a saturated Rochelle salt solution. The mixture is then steam distilled for 50 minutes during which time a solid separates which is collected on a filter, dried, and recrystallized from a mixture of ether and petroleum ether. The 3-methoxy-13-methyl-1,4,6,7,8,9,11,12,13,14,16,17 - dodecahydro-15H-cyclopenta[a]phenanthren-17-one thus obtained melts at about 131–133° C. It has the structural formula

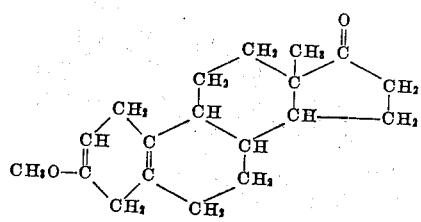

A solution of 57 parts of 3-methoxy-13-methyl- 1,4,6,7,8,9,11,12,13,14,16,17 - dodecahydro - 15H-cyclopenta[a]phenanthren-17-one in 1100 parts of anhydrous toluene and 1800 parts of ether is saturated with dry acetylene. While a slow stream of acetylene is passed through the reaction mixture, a solution of potassium tert. butoxide (prepared from 60 parts of potassium) in 1200 parts of tert.-butanol is added with stirring in the course of 2 hours. Passage of acetylene is continued with stirring for an additional 6 hours and, after standing for 8 hours, the solution is decomposed by the addition of 2650 parts of a saturated ammonium chloride solution and 24 parts of concentrated hydrochloric acid with stirring. The reaction mixture is then extracted with ether and the extract is washed with water, dried over sodium sulfate, filtered and solvent stripped in vacuo. The resulting 3-methoxy-13-methyl - 17 - ethynyl - 1,4,6,7,8,9,11,12,13,14,16,17-dodecahydro - 15H - cyclopenta[a]phenanthren-17-ol is crystallized successively from methanol and acetone. It forms white crystals melting at 174–176° C. It is obtained in the form of a diastereomeric mixture in which the 17-β-hydroxy isomer predominates.

A solution of 26.3 parts of this ethynyl compound in 1000 parts of anhydrous dioxane is hydrogenated in the presence of a palladium-lead catalyst. The hydrogenation is stopped after the addition of the theoretical amount of hydrogen. The reaction mixture is filtered and the solvent is removed in vacuo. The diastereomeric mixture of 3-methoxy-13-methyl-17-vinyl-1,4,6,7,8,9,11,12,13,14,16,17-dodecahydro - 15H - cyclopenta[a]phenanthren-17-ol is recrystallized from methanol. It has the structural formula

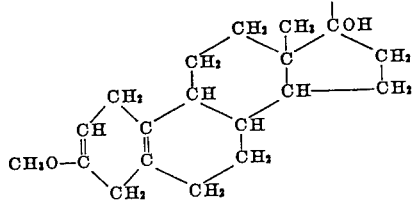

To a boiling solution of 10 parts of the 3-methoxy-13-methyl - 17 - vinyl-1,4,6,7,8,9,11,12,13,14,16,17-dodecahydro - 15H - cyclopenta[a]phenanthren-17-ol in 400 parts of methanol, 45 parts of concentrated hydrochloric acid in 160 parts of water are added dropwise over a period of 3 minutes. The resulting solution is permitted to cool slowly to room temperature and is then extracted with ether. This ether extract is washed successively with water, sodium bicarbonate and water and then dried over anhydrous sodium sulfate. The resulting 13-methyl-17-hydroxy-17-vinyl - 1,2,3,6,7,8,9,10,11,12,13,14,16,17 - tetradecahydro-15H-cyclopenta[a]phenanthren-3-one is recrystallized from dilute methanol. It has the structural formula

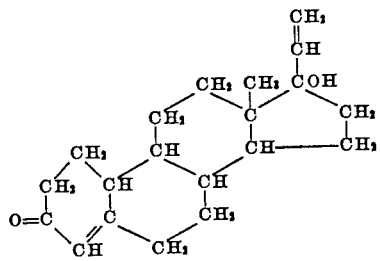

A solution of 400 parts of this vinyl compound in 5000 parts of chloroform is added dropwise to a solution of 120 parts of phosphorus tribromide in 3100 parts of absolute chloroform, maintained at 5–20° C. 200 parts of pyridine are added. The mixture is kept in the cold for 24 hours and then permitted to come to room temperature. After treatment with additional chloroform the mixture is washed first with dilute hydrochloric acid, then with dilute sodium bicarbonate and finally with water. After drying over anhydrous sodium sulfate the chloroform is stripped off and the product is recrystallized several times from acetone. 200 parts of the resulting bromide and 450 parts of dry powdered potassium acetate are shaken in dry acetone for 3 days. The precipitate is removed by filtration and the filtrate is concentrated in vacuo yielding the 13-methyl-17-(β - acetoxyethylidene) - 1,2,3,6,7,8,9,10,11,12,13,14,16,17-tetradecahydro - 15H - cyclopenta[a]phenanthren-3-one which has the structural formula

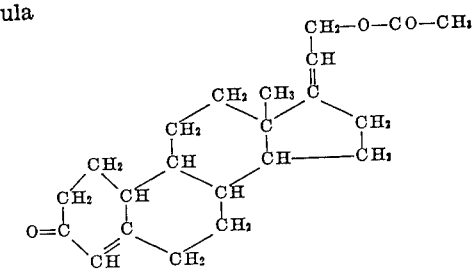

35.6 parts of this compound are dissolved in 400 parts of tertiary butanol and treated with 103 parts of a 1.5 M anhydrous solution of hydrogen peroxide in tertiary butanol. In the course of 15 minutes 80 parts of a solution of 2.55 parts of osmium tetroxide in 200 parts of tertiary butanol are added and the remainder of the osmium tetroxide solution is added in the course of 30 hours at room temperature. The reaction is completed by shaking for an additional 3 days at room temperature. The reaction mixture is then treated with water and the tertiary butanol is removed in vacuo. The residue is dissolved in methylene chloride, washed with water, dried over anhydrous sodium sulfate, and stripped of solvent in vacuo. The residue is dissolved in 1000 parts of methanol and treated with a solution of 15 parts of an 85% solution of sodium sulfite in 250 parts of water and heated at reflux temperature for 30 minutes. After addition of water the reaction mixture is extracted with methylene chloride, dried over anhydrous sodium sulfate and solvent stripped in vacuo. The residue is acetylated with an excess over one equivalent of pyridine and acetic anhydride at room temperature for 6 hours. The mixture is then solvent stripped in vacuo and the residue crystallized from ether. There is thus obtained a stereoisomeric mixture of the 13-methyl-17-hydroxy-17-(β-acetoxyacetyl) -1,2,3,6,7,8,9,10,11,12,13,14,16,17-tetradecahydro-15H -cyclopenta[a]phenanthren-3-one in which the 17-α-hydroxy isomer predominates greatly. It has the structural formula

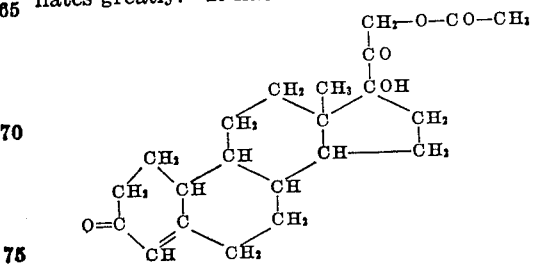

Example 2

A stirred solution of 10 parts of 3-benzyloxy-estran-17-ol in 300 parts of diethyl ether is treated first with 300 parts of liquid ammonia and then with 7.8 parts of lithium in small pieces. Stirring is continued for 15 minutes after which 31 parts of absolute ethanol are added dropwise in the course of 20 minutes. After disappearance of the blue color the ammonia is evaporated on the steam bath and water is then added to decompose the reaction mixture. The aqueous layer is separated and extracted with ether. This ether extract is washed with water, dried over anhydrous sodium sulfate, filtered and solvent stripped to yield the 3-benzyloxy-13-methyl-1,4,6,7,8,9,11,12,13,14,16,17 - dodecahydro-15H-cyclopenta[a]-phenanthren-17-ol. A solution of 15 parts of this ether, 75 parts of aluminum phenoxide and 83 parts of dry cyclohexanone in 500 parts of anhydrous xylene is heated at reflux temperature for 90 minutes and then treated with water and 90 parts of a saturated solution of sodium potassium tartrate. The mixture is steam distilled in the course of an hour and the separating solid is dried under vacuum and crystallized from a mixture of ether and petroleum ether. The 3-benzyloxy - 13 - methyl-1,4,6,7,8,9,11,12,13,14,16,17-dodecahydro - 15H - cyclopenta[a]phenanthren-17-one thus obtained has the structural formula

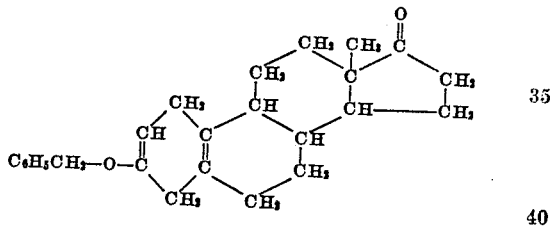

I claim:
1. The compounds of the structural formula

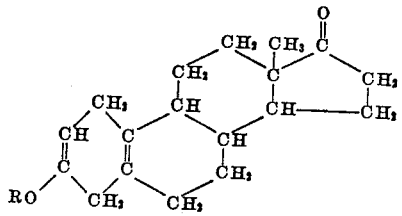

wherein R is a member of the class consisting of lower alkyl and lower phenylalkyl radicals.

2. The 3-(lower alkoxy)-13-methyl-1,4,6,7,8,9,11,12,13,14,16,17-dodecahydro - 15H - cyclopenta[a]phenanthren-17-one of the structural formula

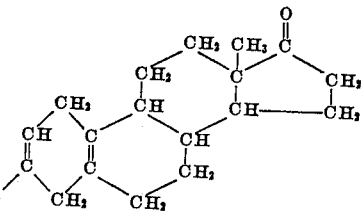

3. 3-methoxy-13-methyl - 1,4,6,7,8,9,11,12,13,14,16,17-dodecahydro - 15H - cyclopenta[a]phenanthren-17-one.

4. 3-benzyloxy - 13 - methyl-1,4,6,7,8,9,11,12,13,14,16,17-dodecahydro-15H-cyclopenta[a]phenanthren-17-one.

FRANK B. COLTON.

No references cited.